(12) United States Patent  
Denton et al.

(10) Patent No.: US 8,196,933 B2
(45) Date of Patent: Jun. 12, 2012

(54) SEAL WITH PLASTIC INNER CUP

(75) Inventors: Dennis N. Denton, Gastonia, NC (US); Linas L. Maskaliunas, Geneva, IL (US); Sandra L. Stroup, Elgin, IL (US)

(73) Assignee: SKF USA Inc., Elgin, IL (US)

( * ) Notice: Subject to any disclaimer, the term of this patent is extended or adjusted under 35 U.S.C. 154(b) by 1944 days.

(21) Appl. No.: 10/889,505

(22) Filed: Jul. 12, 2004

(65) Prior Publication Data
US 2006/0006607 A1   Jan. 12, 2006

(51) Int. Cl.
F16J 15/32   (2006.01)
(52) U.S. Cl. ........................................... 277/576
(58) Field of Classification Search .............. 277/549, 277/551, 562, 423, 424, 353, 572, 576, 577
See application file for complete search history.

(56) References Cited

U.S. PATENT DOCUMENTS

| | | | | |
|---|---|---|---|---|
| 1,428,267 A * | 9/1922 | Soldane et al. | ............... | 277/555 |
| 1,963,936 A * | 6/1934 | Clark | ............... | 277/555 |
| 2,172,325 A * | 9/1939 | Victor et al. | ............... | 277/577 |
| 2,818,287 A * | 12/1957 | Josephson | ............... | 277/530 |
| 3,135,518 A * | 6/1964 | Carson et al. | ............... | 277/351 |
| 3,341,264 A * | 9/1967 | Otto | ............... | 384/486 |
| 3,762,726 A * | 10/1973 | Jornhagen | ............... | 277/568 |
| 4,037,849 A | 7/1977 | Thumm | ............... | 277/353 |
| 4,172,599 A * | 10/1979 | Forch | ............... | 277/552 |
| 4,185,838 A * | 1/1980 | Danner | ............... | 277/562 |
| 4,208,057 A | 6/1980 | Messenger | ............... | 277/309 |
| 4,226,426 A * | 10/1980 | Messenger | ............... | 277/353 |
| 4,285,526 A | 8/1981 | Klinteberg et al. | ............... | 277/565 |
| 4,327,922 A * | 5/1982 | Walther | ............... | 277/571 |
| 4,336,945 A | 6/1982 | Christiansen et al. | ............... | 277/559 |
| 4,345,770 A * | 8/1982 | Seeh | ............... | 277/364 |
| 4,432,557 A * | 2/1984 | Drucktenhengst | ............... | 277/351 |
| 4,448,426 A * | 5/1984 | Jackowski et al. | ............... | 277/353 |
| 4,550,920 A * | 11/1985 | Matsushima | ............... | 277/559 |
| 4,696,479 A | 9/1987 | Karcher | ............... | 277/353 |
| 4,962,936 A | 10/1990 | Matsushima | ............... | 277/364 |
| 5,004,248 A * | 4/1991 | Messenger et al. | ............... | 277/351 |
| 5,096,207 A * | 3/1992 | Seeh et al. | ............... | 277/353 |
| 5,123,660 A * | 6/1992 | Dahlheimer et al. | ............... | 277/393 |
| 5,149,207 A * | 9/1992 | Vignoito | ............... | 384/478 |
| 5,211,406 A * | 5/1993 | Katzensteiner | ............... | 277/351 |
| 5,286,038 A | 2/1994 | Abraham et al. | ............... | 277/568 |
| 5,398,942 A | 3/1995 | Duckwall et al. | ............... | 277/353 |
| 5,407,213 A | 4/1995 | Ouchi et al. | ............... | 277/317 |
| 5,522,600 A | 6/1996 | Duckwall | ............... | 277/402 |
| 5,813,676 A | 9/1998 | Antonini et al. | ............... | 277/551 |
| 6,464,228 B1 * | 10/2002 | Oldenburg | ............... | 277/309 |
| 6,692,007 B2 | 2/2004 | Oldenburg | ............... | 277/353 |
| 2002/0089125 A1 | 7/2002 | Hosokawa et al. | ............... | 277/572 |

* cited by examiner

Primary Examiner — Darnell Jayne
(74) Attorney, Agent, or Firm — Vedder Price P.C.

(57) ABSTRACT

A heavy duty composite oil seal with an outer cup and a plastic inner cup. The outer cup includes a major diameter mounting flange portion terminating in a curl, a minor diameter wear sleeve portion, and a transition portion joining the major and minor diameter portions. There is an elastomeric seal body and an embedded stiffener, with the elastomeric seal body having a sealing lip contacting the inner axial surface of the wear sleeve portion. There is a plastic inner cup member with an axial flange substantially co-extensive with the mounting flange and entrapped along the major diameter flange portion between the curl portion and the transition portion of the outer cup. The inner cup also has a radially extending flange that engages a radial portion of the elastomeric seal body. The plastic inner cup member has plural, evenly spaced diagonal braces extending between and joining the axial flange and the radial flange of the inner cup.

11 Claims, 2 Drawing Sheets

SEAL WITH PLASTIC INNER CUP

BACKGROUND OF THE INVENTION

The present invention relates generally to oil and grease seals for large trucks, semi-trailers and the like, and particularly to unitized seals having composite casings, i.e. one wherein the casings include both metal outer portions as well as plastic inner cups, particularly plastic inner cups with supporting or strengthening ribs, and stiffeners to which elastomeric bodies are bonded. The elastomeric body usually, but not always, includes a primary lip, a dirt lip and an excluder lip.

Such seals are generally unitized seals for heavy duty applications, such as on the wheels of trucks, tractors, semi-trailers and so on. The usual type of seal has a casing including an outer cup, which may or may not engage an excluder lip at its end, but almost always has one or more steps in its diameters. This outer casing or outer cup then also encloses a so-called inner cup which is crimped or rolled in position within the outer cup.

One diameter of the outer cup usually provides a wear surface for a primary seal lip and one or more auxiliary lips, all of which are formed in a separate piece and bonded to a stiffener. All these parts are held in place axially by the inner cup. Thus, the normal assembly contains an outer cup, an inner cup, and these entrap between them a seal containing at least a primary lip and a casing or stiffener of its own.

In this form of seal, either part can rotate. One part is securely fastened to a part that rotates and the other is affixed to a non-rotary part. The primary and secondary lips or primary and dirt lip seals are supported by a metal part or stiffener, whereas the outer casing serves as both the mounting flange and the wear sleeve for the combination.

In the past, there has been a large number of designs in which both components are made from metal; the wear sleeve and the inner cup. A few limited attempts have been made to form the outer cup from a plastic material. However, such attempts have always met with failure, primarily because the plastic cup or wear sleeve lacked the necessary stiffness and especially because it was not suitable for seating or being forced into the seal-receiving opening with the force required. When it was sized so as to be forced into the seal opening, it would usually collapse or otherwise be deformed, making it unsuitable for such application. If it were dimensioned with little or no interference, it would not seal properly. As the result of such efforts, attempts to make a plastic outer cup have uniformly met with failure.

On the other hand, such seals also contained an inner cup, which has different requirements from the outer cup, and yet no efforts have been made to form the inner cup from a plastic material. The present invention concerns making the inner cup from a plastic material, and particularly a plastic material which has a variety of supports or strengthening ribs throughout its circumference. In addition, the plastic inner cup may have an angular wall for additional support and to prevent excessive agitation of entrapped oil.

In some cases, the ribs or strengthening formations on the inner cup have notched out areas to prevent possible interference with various bearings or other components of the wheel hub mechanism.

Accordingly, there are considerable advantages to be had in this type of product by the use of a plastic material. For example, the component or the inner cup can be made with almost any type of coloring, because the color potential for plastics is relatively unlimited. Such a seal can easily have manufacturing identifications placed on it, such as the date of manufacture, the identification of the supplier and so on. These can be placed on the molded inner cup with readily changeable inserts. Needless to say, such parts can be made at reduced cost in relation to making them of metal. For example, also there are no troublesome sharp or cut edges characteristic of the inner metal cups of the prior art. Needless to say, the use of plastic would create greater design flexibility because of the ease with which a plastic inner cup can incorporate components such as magnets, tone rings, heat sensors, etc. which can be molded in place as an integral part of the inner cup, or added later. Consequently, an appropriate location could be reserved for such parts in the future.

The use of a plastic inner cup would simplify a complex method of manufacturing, create a potential for reducing noise, and have the potential of greatly reduced weight. Such an inner cup would avoid an abrasive contact with mating parts and thus reduce the amount of heat potential caused by rubbing a plurality of metal and rubber parts together. Complex shapes could be made in such an inner cup without the difficulties encountered in putting counterpart complex shapes in metal inner cups.

Consequently, it is an object of the present invention to provide a seal, particularly a unitized seal, having a metal outer cup combined with a plastic inner cup.

Another object is to provide a plastic inner cup which is strong but may be manufactured in a complex shape.

A further object of the invention is to provide a plastic inner cup for a heavy duty seal wherein the plastic inner cup contains a plurality of regularly spaced stiffening ribs or the like.

A still further object of the invention is to provide a plastic inner cup for complex seals which contains not only ribs, but which ribs are combined with cutouts or the like to clear various otherwise interfering parts.

A still further object of the invention is to provide a plastic inner cup thereby reducing the noise potential for such seals in use.

A further object of the invention is to reduce the weight of such seals, in view of the several times lower density of the plastic material compared to metal.

A still further object is to reduce manufacturing cost.

These and other objects of the present invention are provided by having a seal made from an outer cup having a complex contour and serving as a wear sleeve, an inner seal member including a steel stiffener or casing surrounded by a rubber member which serves as the primary seal, and a third member or inner cup made from a plastic material and secured in place within the outer cup, preferably having a plurality of evenly spaced stiffeners or ribs of various forms, including reinforcing ribs and/or notched ribs, on the plastic inner cup.

The manner in which these objects and others are achieved in practice will become more clearly apparent when reference is made to the following detailed description of the invention set forth by way of example and shown in the accompanying drawings in which like reference numerals indicate corresponding parts throughout.

DESCRIPTION OF THE PREFERRED
EMBODIMENT OF THE INVENTION

While the invention is capable of being embodied in a number of different forms, a description will be given of several different presently preferred embodiments of the invention, all of which take advantage of the novel features offered by the invention.

Figure 1:
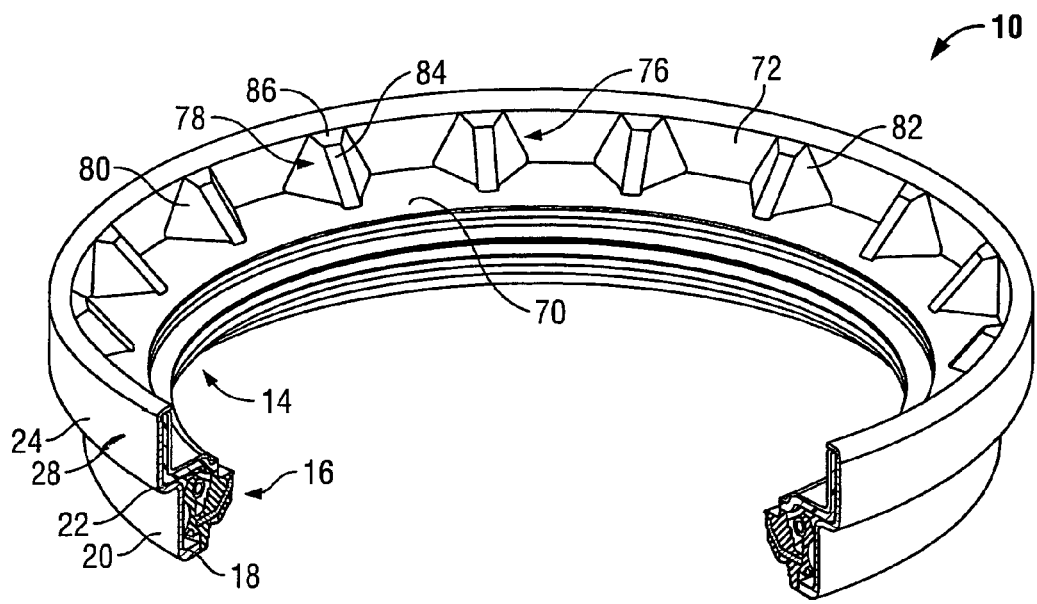
FIG. 1 is a perspective view of one form of unitized oil seal made according to the invention, shown with portions broken away.
Figure 2:
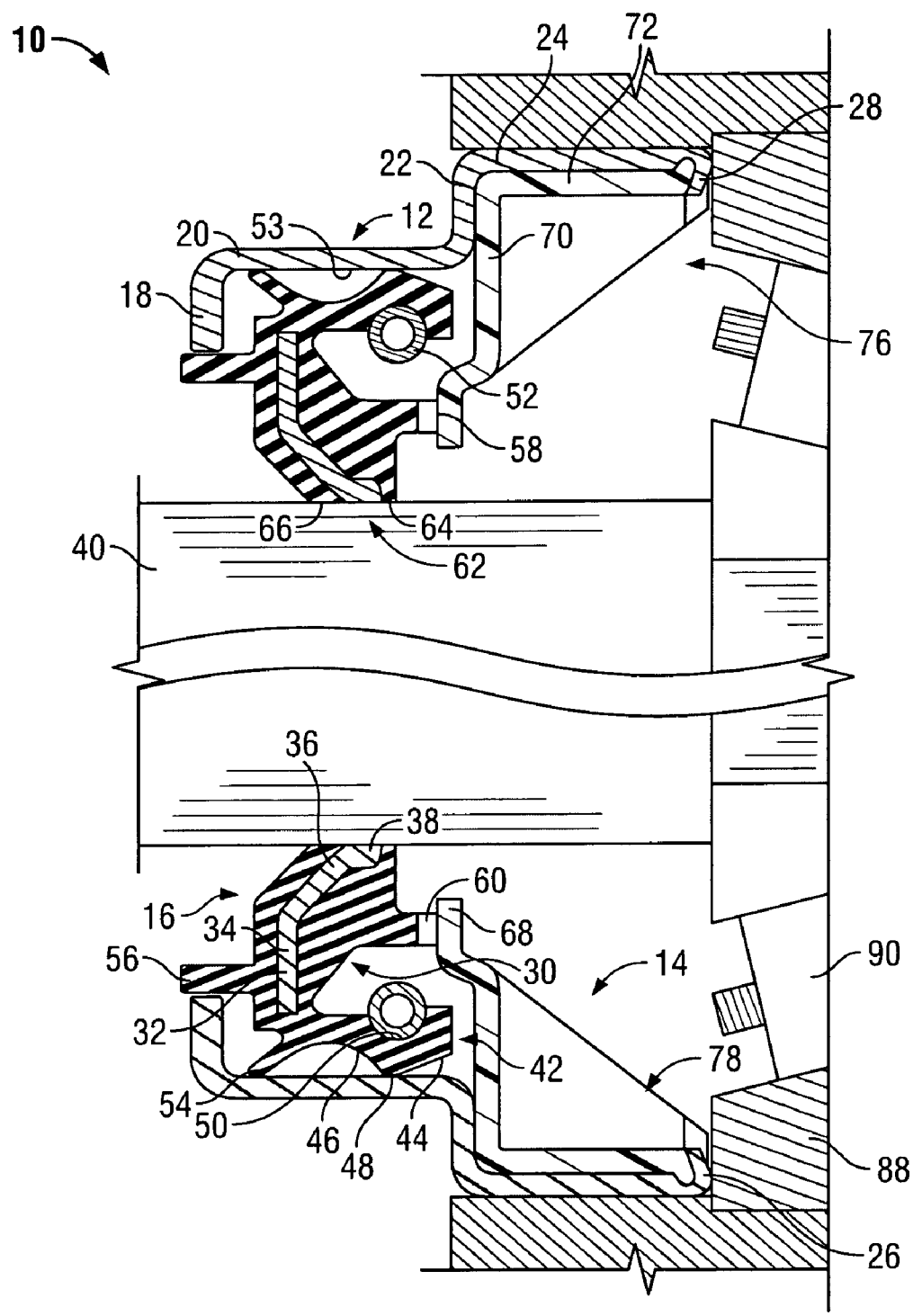
FIG. 2 is a greatly enlarged fragmentary vertical sectional view of the seal shown in FIG. 1, showing an axle inserted into the seal the details of the rubber seal lip of the invention.

Referring now to the drawings in greater detail, FIGS. 1 and 2 show the invention to be embodied in a heavy duty unitized oil seal generally designated 10. The seal 10 includes a steel or other metal outer cup generally designated 12, a plastic inner cup generally designated 14, and an elastomeric seal assembly generally designated 16.

The steel outer cup, as best shown in FIG. 2, includes a number of characteristics, including an inner, radially extending flange 18, a minor diameter, axially extending flange 20 having a surface portion joined at one end to a transition flange 22, and a major diameter, axially extending mounting flange 24. The major diameter mounting flange portion 24 ends in a reduced thickness portion 26 which is formed into a radially inwardly extending curl 28, to which reference will be made later.

The composite elastomeric and metal seal assembly generally designated 16 includes a rubber or other elastomeric seal body generally designated 30 and this body 30 is shown to include an embedded stiffener 32 made from metal and having a primary bonding portion 34 within the elastomeric body 30. There is also an inclined, smaller diameter portion 36 extending inwardly from the primary bonding portion 34 and terminating in a generally axially extending stub flange 38. The stub flange 38 is designed for fluid-tight attachment to a fixed or rotary shaft or stub axle 40 so that the seal body 30 may be pressed thereon and rotatable (or fixed) therewith, depending on the application, and this press fit will be fluid-tight.

The seal body itself 30 includes a primary lip portion generally designated 42, having a generally frusto-conical oil side surface 44, and a generally frusto-conical air side surface 46 meeting along a seal band 48 of intended contact between the body 30 and the minor diameter portion 20 of the steel outer cup 12. The seal 10 also includes a spring groove 50, to accommodate a garter spring 52, urging lip 42 radially outwardly against the inner surface 53 of the minor diameter 20 of the outer casing or outer cup 12.

In addition, the seal body 30 includes a dirt lip 54, and an axially extending auxiliary or excluder lip 56. These components are formed on the seal body 30, and are only illustrative of what is typically embodied in such a seal. There may be considerable variation in the form of lips and their exact location. There may be single lips, as shown, or multiple lips (not shown). The remainder of the seal body 30 may include chaplets 58 as illustrated with spaces 60 in between them to space the body from the plastic inner cup 14 and allow oil to pass therethrough in limited quantities.

The rubber and steel static seal area generally designated 62, lies to either side of the stub flange 38 and comprises axially inner and outer contact portions 64, 66. The chaplets 58 bear against a small offset flange 68, the flange being offset from the main radial flange 70 of the plastic inner cup 14. A principal axial flange 72 lies within and in contact with the major diameter portion 24 of the outer casing, and is locked there in position by reason of the curl 28 which clamps the principal axial portion 72 in place between the curl 28 and the transition flange 22.

Another important feature of the invention is the diagonal brace generally designated 76 which reinforces the connection between the radial and axial flanges 70, 72. The web portion generally designated 78 of this brace contains two inclined sidewall portions 80, 82 (FIG. 1), and a central portion or backbone 84. This web has its sidewalls 80, 82 placed at about a 40° to 50° an angle to add maximum strength.

In addition, the web portion 78 of this brace has an angled flat surface 84 ending in a radial, flared out or notched surface 86. This surface 86 is provided to make a notch, space or clearance for the outer race 88 and the bearings 90.

Figure 3:
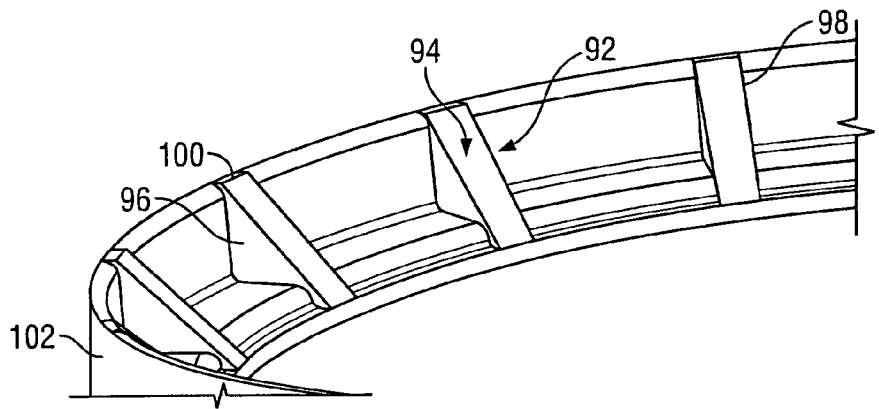
FIG. 3 is a perspective view of a part of the plastic inner cup component of a somewhat different embodiment than that shown in FIGS. 1 and 2.

FIG. 3 shows another embodiment, wherein the ribs 92 also have three surfaces, a center diagonal surface 94 and generally designated two sidewall portions 96, 98. In this embodiment, the reinforcing ribs 92 have relatively radial sidewalls 96, 98 but the ribs 92 are wider than in the other embodiments. The tops 100 are substantially coextensive with the principal axial flange 102.

Figure 4:
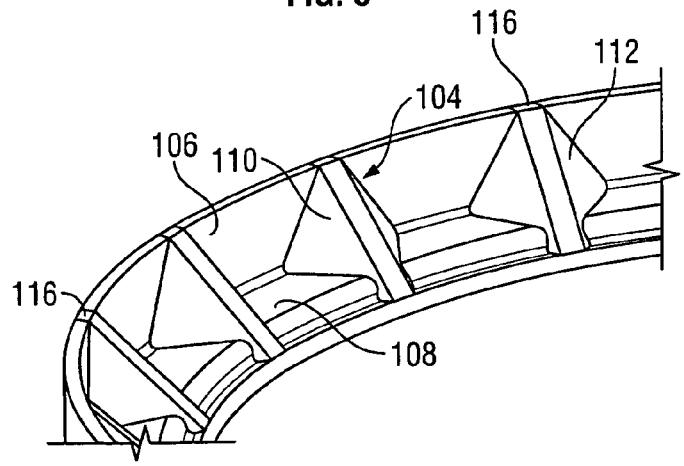
FIG. 4 is a perspective view of a still further variation in the form of plastic inner cup as shown in FIGS. 1-3.

FIG. 4 shows an embodiment wherein the ribs generally designated 104 that connect the axial wall 106 and the radial wall 108 have sidewalls 110, 112 that are flared out considerably. These ribs 104 extend to the top of the axial wall 106 and have a flat surface portion 116, but are not cut away to afford clearance for the races or bearings.

The above illustrations of various forms of reinforcing ribs are preferred, but they are far from the only forms of reinforcing ribs which could be used. Some ribs are of course required, to prevent collapse of the outer diameter of the plastic cup. The type of plastic used would need to be considered also; some of the stiffer forms may need smaller or less numerous ribs. For example, making the inner cup from glass reinforced nylon, or high temperature reinforced nylon is desired. However, other plastics, such as high temperature engineered plastics for example, may be used. The number of ribs should also be considered; the form illustrated uses 18 ribs, i.e., one every 20° of circumference. One every 10° to 15° of circumference could be used, however.

Referring now to the elastomeric lip formation, a primary lip and an excluder lip are shown. However, the primary lip may be a double or triple lip, and the dirt lip may be excluded altogether, or may be of a double or triple lip form. The excluder lip may be omitted, or take on a different form also. The stiffener also follows the form of the lip body, but it may assume various forms, also. The chaplet 58 are one preferred form of providing space between the lip body and the radial flange of the inner lip. However, other formations may be used.

It will thus be seen that the present invention provides a novel seal with a plastic inner cup having a number of advantages and characteristics including those herein pointed out and others which are inherent in the invention.

The invention claimed is:

1. A heavy duty composite oil seal, comprising, in combination, an outer cup, including an axially extending major diameter mounting flange portion terminating in a curl portion, an axially extending, minor diameter wear sleeve portion, a transition portion joining said axially extending major diameter portion and said minor diameter wear sleeve portion, a seal element including an elastomeric seal body and an embedded stiffener, said elastomeric seal body having a sealing lip contacting the inner axial surface of said minor diameter wear sleeve portion, and a relatively rigid plastic inner cup member having an axial flange substantially co-extensive with said axially extending major diameter mounting flange portion and entrapped along said axially extending major diameter mounting flange portion between said curl portion and said transition portion of said outer cup, said plastic inner cup member also having a radially extending flange engaging a radial portion of said elastomeric seal body, said relatively rigid plastic inner cup member having plural, evenly spaced diagonal braces extending between and joining said axial flange and said radially extending flange of said inner cup.

2. A heavy duty composite oil seal as defined in claim 1 wherein said curl portion is made from a reduced thickness of material comprising said outer cup.

3. A heavy duty composite oil seal as defined in claim 1 wherein said elastomeric seal body portion has an excluder lip, and said axially extending, minor diameter wear sleeve portion has a second, radially inwardly extending flange, said sealing lip extending beyond said second radially inwardly extending flange and being disposed closely adjacent thereto.

4. A heavy duty composite oil seal as defined in claim 1 wherein said embedded stiffener has at least one portion of said elastomeric seal body extending radially inwardly just beyond said embedded stiffener, whereby said elastomeric seal body makes a fluid-tight fit with a mating part.

5. A heavy duty composite oil seal as defined in claim 4 wherein said at least one portion of said elastomeric seal body comprises two portions of said elastomeric seal body.

6. A heavy duty composite oil seal as defined in claim 1, wherein said radially extending flange on said inner cup includes a radially innermost offset portion engaging said radial portion of said elastomeric body.

7. A heavy duty composite oil seal as defined in claim 1 wherein each of said diagonal braces includes a web portion having two approximately triangular sidewall surface portions.

8. A heavy duty composite oil seal as defined in claim 1 wherein each of said diagonal braces includes a wide backbone portion and two approximately radially extending sidewall surface portions.

9. In combination, an axle and a bearing assembly, and a heavy duty composite oil seal as defined in claim 1 wherein each of said diagonal braces includes a notched portion adjacent the axial flange of said inner cup to afford clearance for said bearing assembly adjacent said elastomeric seal body.

10. A heavy duty composite oil seal as defined in claim 1 wherein said embedded stiffener has a substantially axial portion at the inner diameter portion thereof.

11. A heavy duty composite oil seal, comprising, in combination, a metal outer cup, including an axially extending major diameter mounting flange portion having a reduced thickness portion terminating in a curl portion, an axially extending, minor diameter wear sleeve portion, a transition portion joining said major and minor diameter portions, and a radial flange extending inwardly from said wear sleeve portion, a seal element including an elastomeric seal body and an embedded stiffener, said elastomeric seal body having a sealing lip contacting the inner axial surface of said wear sleeve portion, said stiffener being separated by a working clearance from an associated machine part, said elastomeric seal body having a portion lying just radially inwardly of said stiffener, whereby said portion of said seal body and said stiffener make a fluid tight fit with said associated machine part, and a relatively rigid plastic inner cup member having an axial flange substantially co-extensive with said major diameter mounting flange and entrapped along said major diameter mounting flange portion between said curl portion and said transition portion of said outer cup, said inner cup also having a radially extending flange engaging a radially extending surface on said elastomeric seal body, said relatively rigid plastic inner cup member having plural, evenly spaced diagonal braces extending between and joining said axial flange and said radial flange of said inner cup.

* * * * *